Sept. 1, 1936.    H. L. WILLIAMS    2,052,914
ANCHORING MEANS FOR HOLD-DOWN DEVICES OR ELEMENTS
Original Filed Dec. 24, 1931    2 Sheets-Sheet 1
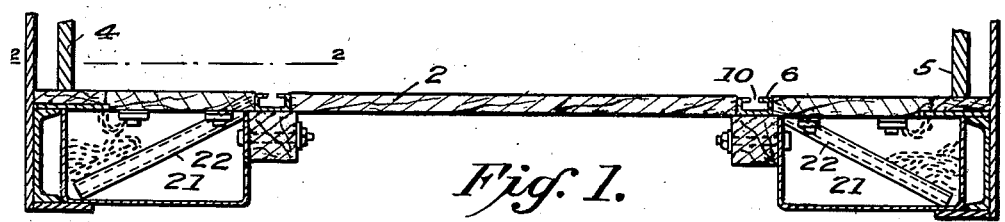
Fig. 1.
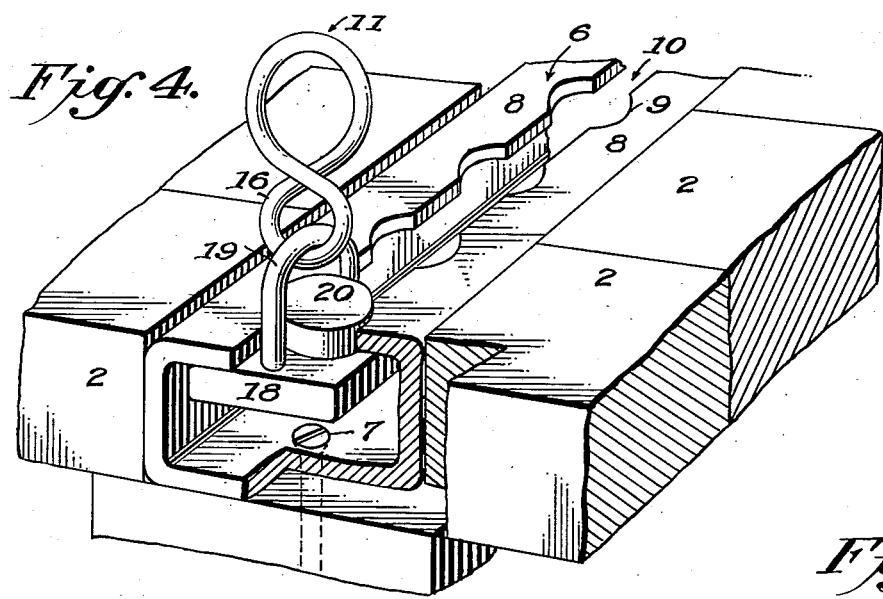
Fig. 4.
Fig. 5.
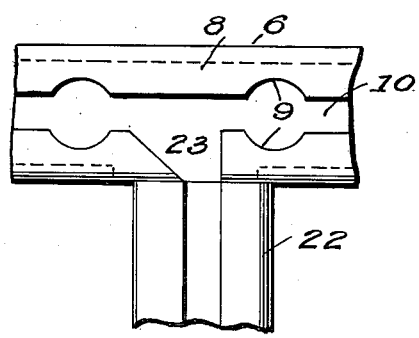
Fig. 6.
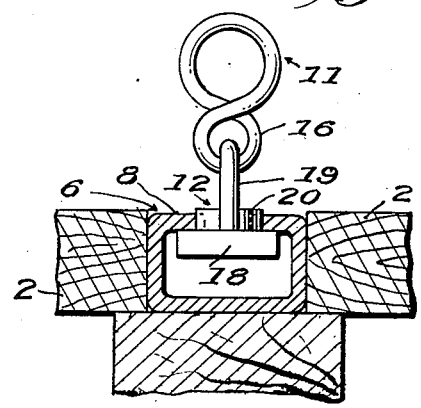
Inventor
Hubert L. Williams
By [signature]
Attorney Sept. 1, 1936.  H. L. WILLIAMS  2,052,914
ANCHORING MEANS FOR HOLD-DOWN DEVICES OR ELEMENTS
Original Filed Dec. 24, 1931  2 Sheets-Sheet 2
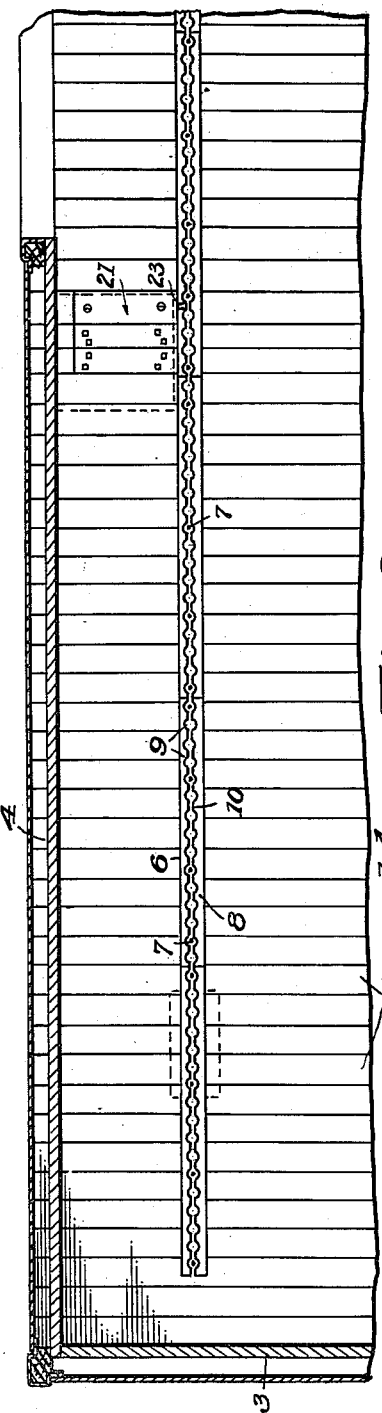
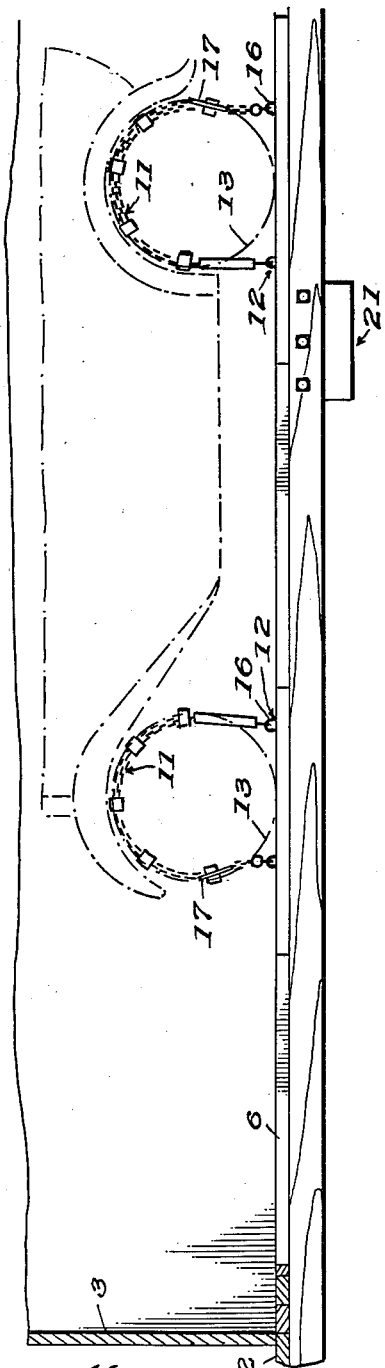
Inventor
Herbert L Williams Patented Sept. 1, 1936

2,052,914

UNITED STATES PATENT OFFICE 2,052,914

ANCHORING MEANS FOR HOLD-DOWN DEVICES OR ELEMENTS

Hubert Lefebvre Williams, Detroit, Mich., assignor to The New York Central Railroad Company, a corporation of New York Original application December 24, 1931, Serial No. 583,091. Divided and this application January 30, 1934, Serial No. 709,025

1 Claim. (Cl. 105—368)

This application is a divison of my prior application for Auto box car, filed December 24, 1931, Serial No. 583,091.

This invention relates to means for securing automobiles or other lading in freight cars for transportation, and particularly to anchoring means for vehicle or article holddown devices or members, whereby the same may be adjustably attached to the floor of the car.

The main object of the invention is to provide anchoring means of the type comprising a hollow or channeled guide rail fixed to the floor of the car and an anchor member movable therein wherein the anchor member may not only be adjusted longitudinally along the guide rail and of the car, but may also by vertical movements be locked to and released from the guide rail to hold it (the said anchor member) from shifting or to free it for adjustment or movement to an inoperative or storage position.

A further object of the invention is to provide a guide rail and anchor member of novel construction whereby such locking and releasing actions are simplified and facilitated and a safe and secure locking action effected.

With these and other objects in view, which will appear in the course of the subjoined description, the invention consists of the novel features of construction, combination and arrangement of parts, hereinafter fully described and claimed, reference being had to the accompanying drawings, in which:—

Fig. 1 is a transverse section through the lower portion of a freight car embodying my invention.

Fig. 2 is a horizontal section on line 2—2 of Fig. 1 through the car on one side of its center and showing the channeled holder or guide rail and cooperating parts at that side.

Fig. 3 is a fragmentary vertical longitudinal section through the car showing some of the hold-down devices embodying the invention in use for fastening an automobile wheel to the car floor.

Fig. 4 is a sectional perspective view on an enlarged scale of a portion of the channeled guide track and the anchor member, showing the latter in locked position.

Fig. 5 is an enlarged plan view of the track rail at its juncture with the branch track.

Fig. 6 is a cross-section through the track showing one of the anchor blocks in locked position.

In the practical embodiment of my invention as herein disclosed, I designates a freight car of ordinary construction including a floor 2, an end wall 3, a pair of side walls 4 and 5, and a roof (not shown). In the floor 2 are located a pair of spaced longitudinally extending channeled guide or holder rails 6, each of which is substantially of C form in cross-section and extends from end to end of the floor. These rails are embedded in the floor so that their slotted or open sides are disposed substantially flush with the upper surface of the floor. The rails are firmly secured in position by bolts or other suitable fastenings 7 and the upper spaced, slot-forming walls 8 of each rail are provided in their inner opposed edges along the entire length of the rail with registering pairs of notches or recesses 9 opening directly into the guide slot 10 disposed between said recessed edges.

A holddown device or element of suitable type is employed to engage and hold a wheel or other part of a vehicle or other article of lading against movement relative to the car floor. The holddown device or element shown in the present instance comprises a chain 11, and in accordance with my present invention this chain is provided with anchor members 12 at its ends for cooperation with the channeled guide rail to hold the vehicle wheel 13 or other engaged article down upon and from movement relative to the floor 2.

The chain 11 may be of any suitable construction, the particular chain structure shown in the present instance being no part of my invention but being shown for indicating one form of holddown chain suitable for the purpose. This holddown chain may be of a type comprising a pair of side chains connected at suitable intervals by cross chains or links, the ends of the chain being suitably connected by links 16 to the anchor members, and one end of the chain being provided with a suitable type of fastening lever means, generally indicated at 17, whereby the chain may be adjusted and drawn taut about the wheel ties or wheels to firmly fasten the wheels to the floor. I do not, however, restrict the invention to use in connection with any particular type of holddown chain or device, as a holddown chain of the character shown in my aforesaid application Serial No. 583,091 for anchoring a vehicle to the car floor or any other approved form of holddown chain or device may be employed.

As shown in the drawings, each anchor member 12 comprises a metallic block or base piece 18 of rectangular or oblong rectangular form adapted to fit within and to be slidably adjustable along the channel of the channeled guide rail when said anchor member is in depressed condition. The block is provided with and has rising therefrom a substantially U-shaped loop or shank 19, forming an eye with which the associated connection link of the chain is engaged. This loop or eye encloses at its base a substantially circular locking boss or stud 20 projecting from the upper surface of the block. This stud is adapted upon the raising of the block to fit within a pair of the opposed locking recesses in the upper wall sections of the guide channels whereby to lock the anchor members against longitudinal movement to the rail, the sides or arms of the looped shank cooperating when the block is in this position to hold the anchor member from rotation. The anchor member, on the other hand, is adapted when released for downward movement to drop into the channel of the guide rail so as to withdraw its locking stud from engagement with the recesses, whereby the anchor member is free to be moved in either direction longitudinally along the rail channel.

It will be evident from the foregoing that the anchor members may be adjusted longitudinally along the track rail to adapt the chain to be engaged with any suitable article or object, and that then by properly applying the holddown chain and raising the anchor blocks in locking position and manipulating and locking the tension lever, the holddown chain may be properly tensioned and drawn tightly about the wheel or object while the anchor block studs are drawn fully into engagemnt with the selected locking recesses, so that the wheel or object will be firmly fastened in position against any possibility of shifting and the parts of the holddown device also firmly secured against shifting movements.

In practice the anchor members are preferably so fitted in their slots that they can not be ordinarily withdrawn, and therefore can not become lost or misplaced. Means are shown for storing the anchor members when not in use comprising a downwardly and laterally inclined anchor reservoir 21 at each side of the car for use with the channeled rail at that side, and into which leads from said rail a channeled branch arm 22 by means of and through which the anchor members not in use may be turned and slidably moved from the main rail into the branch rail to the storage reservoir in which any suitable number and kind of anchor members may be stored for use when and as occasion requires. The upper wall section of the main rail at the point where the branch rail connects therewith is cut away at an angle or beveled so as to provide an entrance and exit passage 23 the walls of which converge toward the branch arm to guide the anchor member in its passage thereto.

The anchor member block or base may be and preferably is, as shown, made of oblong rectangular form so that its major axis is coincident or parallel with the looped shank of the block, while its minor axis is at right angles thereto. The block is so formed and properly dimensioned that it will travel straight along the guide channel of the guide rail and can not enter the channel of the branch rail because its length is greater than the width of said channel, but, by swinging the block around transversely of the guide rail at right angles to its normal position, it may be readily moved into the branch rail for transfer to the storage reservoir.

It will, of course, be readily apparent from the foregoing description that a holddown device and anchoring means of the character described may be provided which may be adjusted along the guide rails to any point or position in the car for use in connection with holddown devices or fasteners of any suitable kind or type, whereby articles or portions of articles disposed at any point in the length of the car may be engaged and clamped. Other advantages of the invention will be apparent to those versed in the art without a further and extended description.

While the particular construction and arrangement of parts disclosed is preferred, it is to be understood that changes in the form, proportions and details of construction may be made within the scope of the appended claim without departing from the spirit or sacrificing any of the advantages of the invention.

Having thus fully described my invention, what I claim is:—

In a freight carrier, a longitudinally extending track in the floor of substantially C-shape in cross-section to provide a T-slot, the walls of said slot being formed with seat recesses, and a T-shaped anchor member longitudinally slidable and vertically movable in said slot, said member comprising a rectangular block, a U-shaped shank extending upwardly therefrom, and a locking stud extending upwardly from the block between the arms of the shank and adapted for engagement with said seat recesses.

HUBERT LEFEBVRE WILLIAMS.